United States Patent
Nguyen

(10) Patent No.: US 11,035,966 B2
(45) Date of Patent: Jun. 15, 2021

(54) METHOD FOR ESTIMATING RESERVOIR FORMATION QUALITY USING SEISMIC VELOCITIES

(71) Applicant: Ha Dinh Nguyen, Katy, TX (US)

(72) Inventor: Ha Dinh Nguyen, Katy, TX (US)

(*) Notice: Subject to any disclaimer, the term of this patent is extended or adjusted under 35 U.S.C. 154(b) by 284 days.

(21) Appl. No.: 16/156,725

(22) Filed: Oct. 10, 2018

(65) Prior Publication Data

US 2019/0113640 A1  Apr. 18, 2019

Related U.S. Application Data

(60) Provisional application No. 62/573,187, filed on Oct. 17, 2017.

(51) Int. Cl.
  *G01V 1/30* (2006.01)
(52) U.S. Cl.
  CPC .............. *G01V 1/303* (2013.01); *G01V 1/306* (2013.01); *G01V 2210/6161* (2013.01); *G01V 2210/6163* (2013.01); *G01V 2210/6167* (2013.01); *G01V 2210/6248* (2013.01)
(58) Field of Classification Search
  CPC . G01V 1/303; G01V 1/306; G01V 2210/6248
  USPC ......................................................... 702/18
  See application file for complete search history.

(56) References Cited

U.S. PATENT DOCUMENTS

| | | | | |
|---|---|---|---|---|
| 5,615,115 A | * | 3/1997 | Shilling ................. | E21B 47/06 702/12 |
| 2002/0169559 A1 | * | 11/2002 | Onyia ..................... | G01V 1/32 702/14 |
| 2003/0004648 A1 | * | 1/2003 | Huffman ................ | G01V 1/306 702/14 |
| 2007/0038377 A1 | * | 2/2007 | Sayers ................... | G01V 1/284 702/9 |
| 2010/0305865 A1 | * | 12/2010 | Bachrach ............... | G01V 1/30 702/11 |
| 2012/0059633 A1 | * | 3/2012 | Dutta ..................... | G01V 1/303 703/2 |
| 2013/0066558 A1 | * | 3/2013 | Wessling ................ | E21B 49/00 702/7 |
| 2014/0076632 A1 | * | 3/2014 | Wessling ................ | E21B 47/06 175/48 |
| 2017/0335675 A1 | * | 11/2017 | Lee ........................ | G01V 1/303 |
| 2018/0284305 A1 | * | 10/2018 | Kacewicz .............. | G01V 1/306 |

* cited by examiner

*Primary Examiner* — Ricky Go
(74) *Attorney, Agent, or Firm* — Richard A. Fagin

(57) ABSTRACT

A method for estimating reservoir quality from a reflection seismic survey includes determining seismic interval velocity (or their inverse, interval transit time "ITT") with respect to depth from the reflection seismic survey. A normal compaction trend of the seismic interval velocity with respect to depth is determined. A fractional amount of sand and a fractional amount of shale at at least one depth is determined based on deviation of the seismic interval velocity (or ITT) at the at least one depth from the normal compaction trend.

9 Claims, 4 Drawing Sheets

METHOD FOR ESTIMATING RESERVOIR FORMATION QUALITY USING SEISMIC VELOCITIES

CROSS REFERENCE TO RELATED APPLICATIONS

Priority is claimed from U.S. Provisional Application No. 62/573,187 filed on Oct. 17, 2017, which application is incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of estimating properties of subsurface formations using reflection seismic surveys. More particularly, the present disclosure relates to methods for estimating quality of subsurface formations that may act as fluid reservoirs using reflection seismic surveys.

Reflection seismic surveys are used, among other purposes, to determine structure, mineral composition and fluid content of subsurface formations. Reflection seismic surveys may be processed to estimate seismic velocities of formations with respect to seismic energy travel time. Seismic velocities with respect to travel time may be used to estimate formation properties with respect to depth in the subsurface.

An important use for estimates of seismic velocities with respect to depth is to estimate fluid pressure and formation fractures in formations that may be penetrated during well drilling through such formations. Estimating fluid pressure with respect to depth may enable safer and more efficient drilling through the subsurface be enabling a well drilling to maintain fluid pressure in the well at a selected amount. Correct selection of drilling fluid density, e.g., that which would exert fluid pressure close to the fluid pressure in the formations and less than a fracture pressure of the formations may prevent unintended influx of formation fluid into a well, collapse of the well and/or prevent unintended loss of drilling fluid in the well to exposed formations by reason of the fluid pressure in the well exceeding the fracture pressure of the exposed formations.

Methods for estimating formation fluid pressure known in the art include, among other methods, the equivalent depth method and a method developed by Eaton, where several types of compressional acoustic wave responses, such as acoustic well logs, vertical seismic profiles ("VSP") and surface reflection seismic velocity are widely used as input data among other types of input date. See, *Abnormal pressure while drilling*, Jean-Paul Mouchet & Alan Mitchell, Boussens, Elf Aquitaine (1989).

The equivalent depth method is given by the following expression:

$$P_z = P_a + (S_z - S_a), \qquad (1)$$

wherein, Pa, z and Sa, are the pore pressure and the stress at a depth of interest z, and at a, the depth along a normal compaction trend at which the measured parameter is the same as it is at the depth of interest. The only unique assumption required by equivalent depth methods is that effective stress is a linear function of depth.

One example of a trend line in the equivalent depth method is illustrated in FIG. 1. First it is assumed that there is a depth section over which the formation fluid pore pressure (gradient) is hydrostatic, and sediments are normally compacted because of the monotonic increase in effective stress with increasing depth. Such depth section may be referred to as a "normally compacted interval." When a measured formation parameter (i.e., a physical property) value is plotted with respect to vertical depth, the normal compaction trend (NCT) can be displayed as substantially straight lines fitted to the parameter measurements made within the normally compacted interval. Because the value of the measured physical property is a unique function of effective stress, the pore pressure at any depth where the measured parameter value is not on the NCT can be computed from—Sa in Eq. (1).

A widely used pore pressure estimation technique is Eaton's method, shown graphically in FIG. 2. Here, stress is used explicitly in the equations:

$$P_p = S - (S - P_{hyd})(R_{log}/R_n)^{1.2} \qquad (2) \text{ and}$$

$$P_p = S - (S - P_{hyd})(\Delta T_n/\Delta T_{log})^{1.0}. \qquad (3)$$

wherein Pp is pore pressure; S is the stress (typically vertical stress, Sv); $P_{hyd}$ is hydrostatic pore pressure; and the subscripts n and log refer to the normal and measured values of formation electrical resistivity (R) and acoustic interval travel time ($\Delta T$) at each depth. Such measurements may be obtained from well logging instruments, as suggested by the subscript log. The exponents shown in the above equations are empirically determined values that may be changed for different geologic regions so that the pore pressure predictions better match pore pressures inferred from other data.

A subsurface pore pressure prediction curve may be calculated using reflection seismic survey data (using determined seismic interval velocities) and such prediction curve may be enhanced by calibrating, wherein the calibrating uses various types of data sets (such as well logs, drilling data, operation data and geologic data). This prediction of pore pressure is usually called the "shale pressure", which includes an estimation of shale thickness and its quality.

For a clastic environment (sand and shale formations), seismic interval velocities are substantially related to seismic responses from formations having different sand-shale ratios of formation intervals that cause impact on elastic wave transmission velocities. Therefore, when intervals with more shale anomalies (amount off the trend line) are used to predict pore pressure, one can also use intervals with more sand anomalies to predict the sand's quality and thickness.

An interval velocity derived prediction curve of sand's quality and thickness may be calibrated with formation evaluation results from wells. On the other hand, a correct pore pressure calibrations may also help to define better sand-formation quality, relatively. This enhancement of integration is a value added to the method.

SUMMARY

A method for estimating reservoir quality from a reflection seismic survey according to one aspect of the present disclosure includes determining seismic interval velocity with respect to depth from the reflection seismic survey. A normal compaction trend of the seismic interval velocity with respect to depth is determined. A fractional amount of sand and a fractional amount of shale at at least one depth is determined based on deviation of the seismic interval velocity from the normal compaction trend at the at least one depth. A seismic derived relative net-to-gross ratio of hydrocarbon volume in a reservoir is determined using the fractional amount of sand and fractional amount of shale.

In some embodiments, the estimating the fractional amount of sand and the fractional amount of shale is determined by the expression:

PP=OBG−(OBG−PHyd)*(ITTintobs/ITTintnor)x;

wherein PP represents formation fluid pressure gradient, wherein the fractional amount of sand is related to the formation fluid pressure gradient, OBG represents overburden gradient with respect to depth, PHyd represents fluid hydrostatic pressure gradient, ITTintnor represents the normal compaction trend for seismic interval transit time (1/interval velocity), ITTintobs (1/Interval velocity) represents an observed seismic interval transit time with respect to depth and x represents an empirical exponent; and wherein the fractional amount of sand is related to the formation fluid pressure gradient.

In some embodiments, the estimating the fractional amount of sand and the fractional amount of shale is determined by the expression:

formation pore pressure=overburden vertical stress−
effective stress σ, wherein a relationship
between the seismic interval velocity and effective stress is determinable.

Some embodiments further comprise calibrating the seismic interval velocity with respect to depth using measurements of a subsurface formation parameter made with respect to depth in a well.

In some embodiments, the subsurface parameter comprises at least one of natural gamma radiation intensity, Neutron porosity, density, electrical resistivity and acoustic travel time.

Some embodiments further comprise calibrating the estimated fractional amount of sand and fractional amount of shale at the at least one depth using measurements of a subsurface formation parameter made with respect to depth in a well.

In some embodiments, the measured subsurface formation parameter comprises natural gamma radiation intensity, neutron porosity, density, electrical resistivity and acoustic travel time.

Some embodiments further comprise using the seismic derived relative net-to-gross ratio to adjust at least one well construction parameter for a well to be drilled through the reservoir.

Some embodiments further comprise determining formation pore pressure with respect to depth from the normal compaction trend.

DETAILED DESCRIPTION

Figure 1:
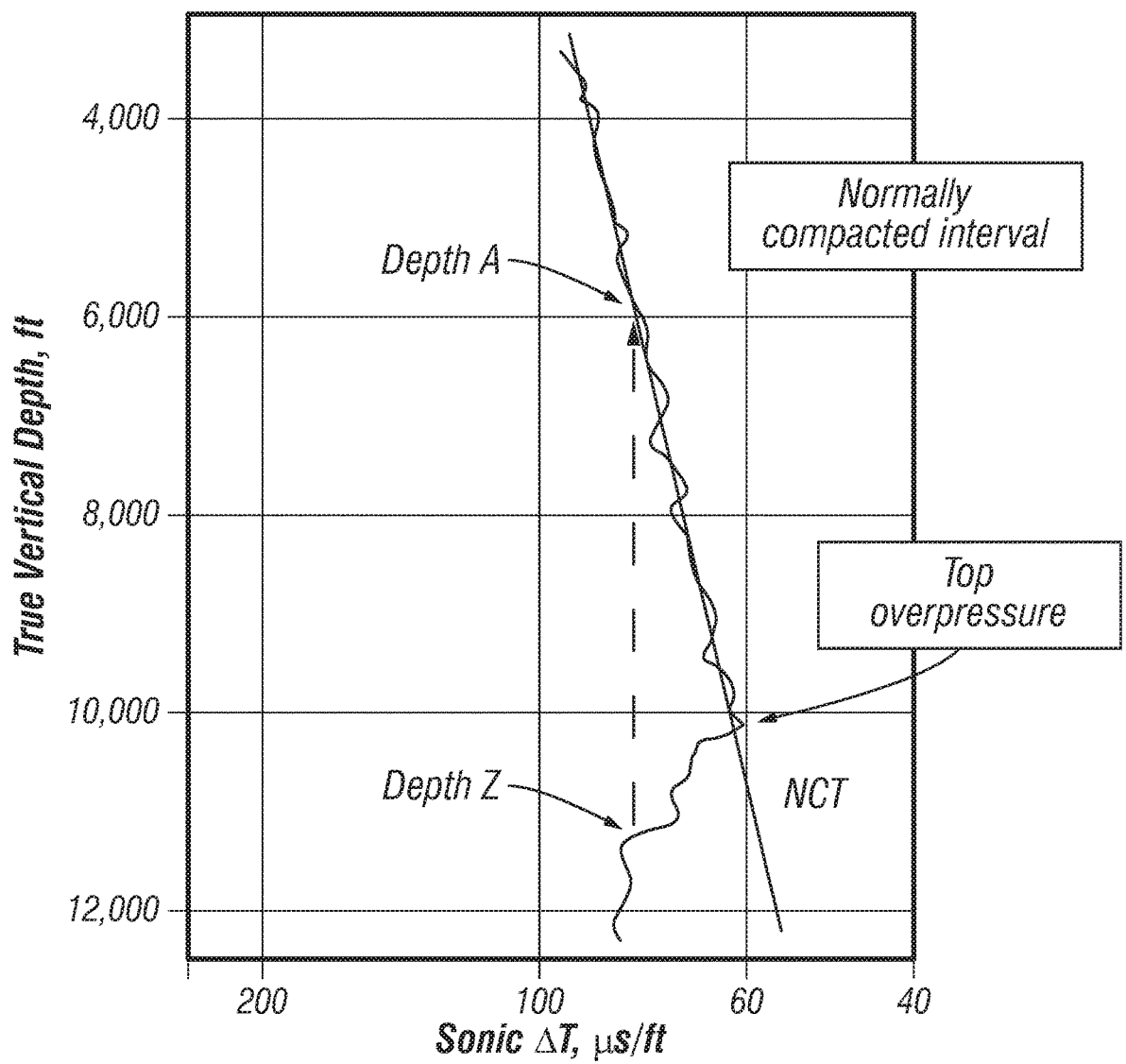
FIG. 1 shows a graphic example of the equivalent depth method for estimating formation pore pressure.
Figure 2:
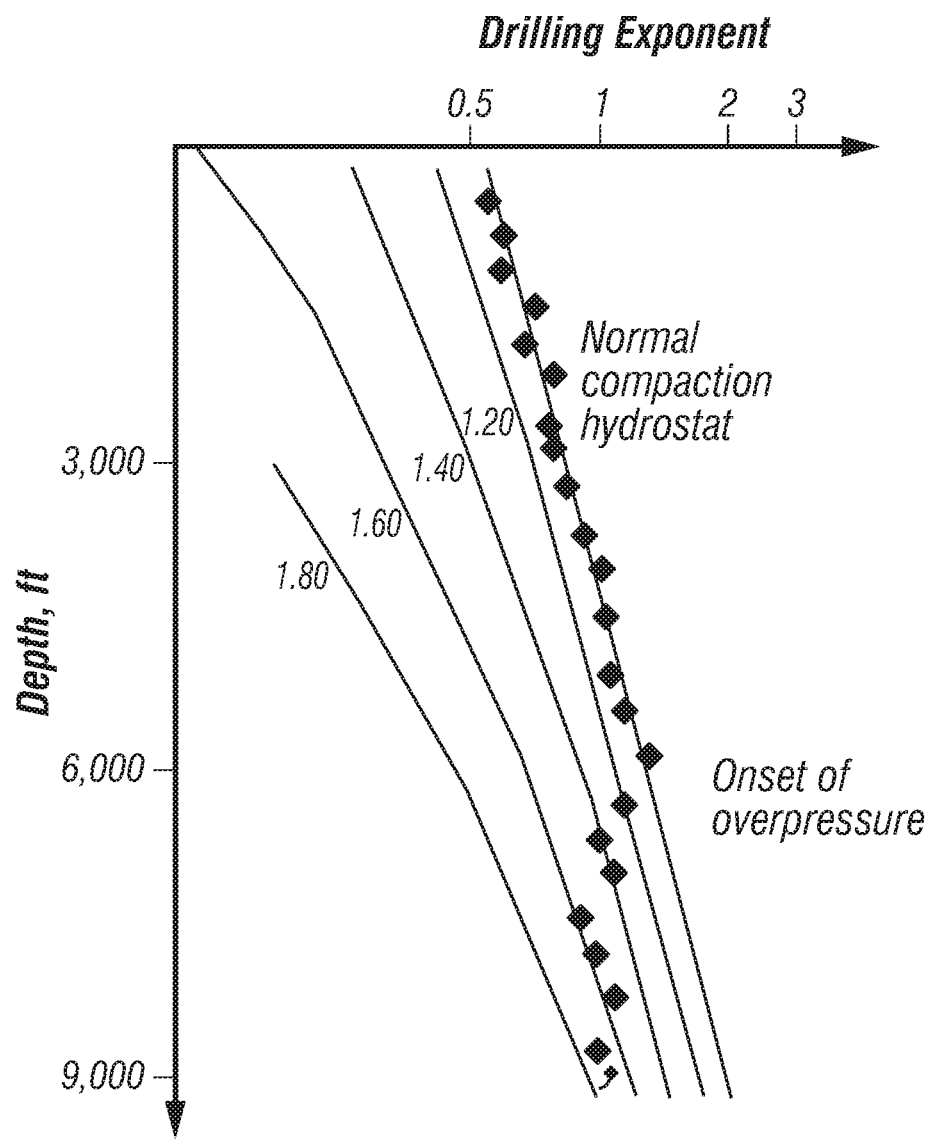
FIG. 2 shows lines for computing pore pressure expressed as an equivalent density, calculated using Eaton's method and the drilling ("d-") exponent. Notice that these "lines" are not linear in semilog space.
Figure 3:
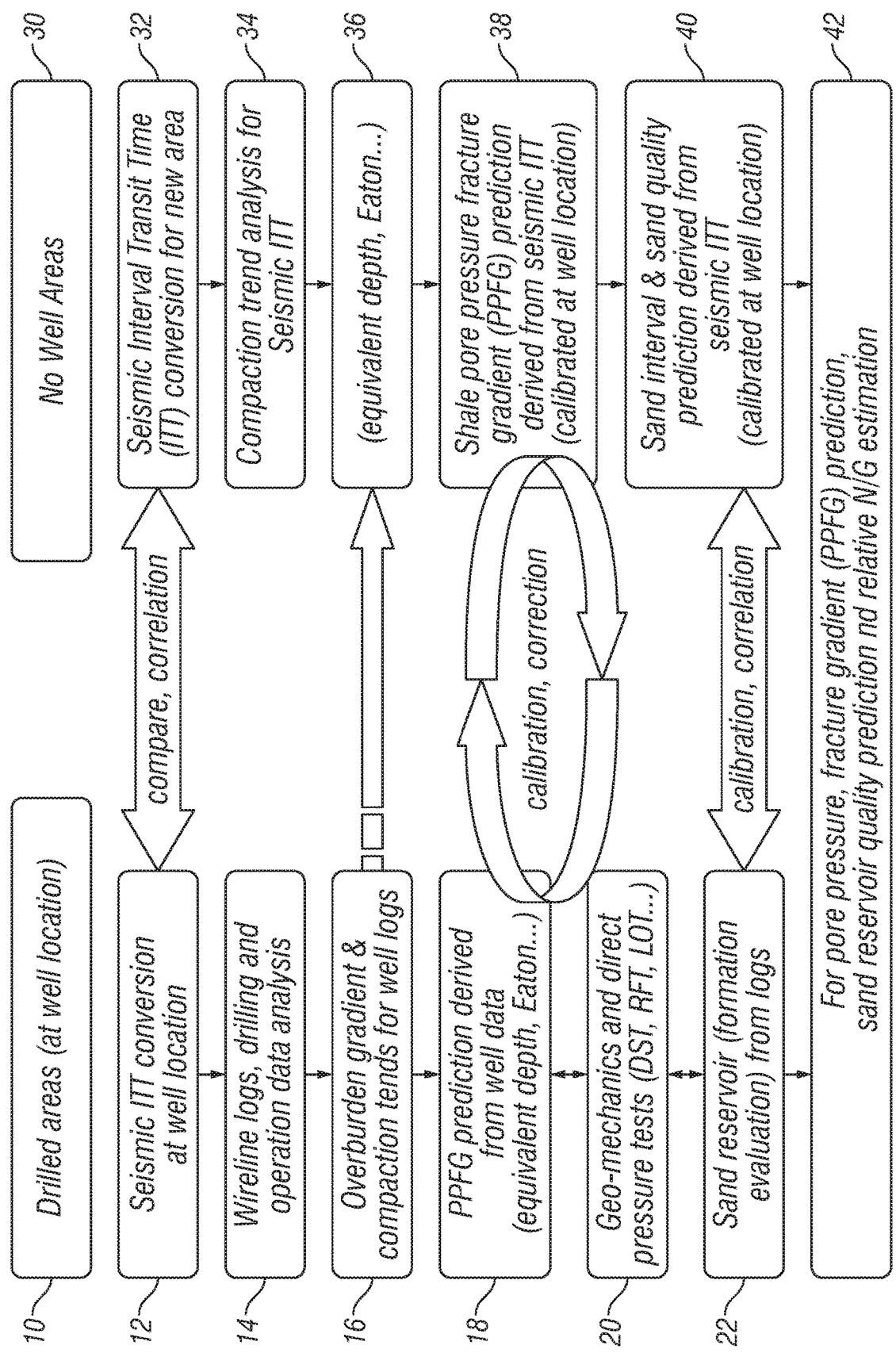
FIG. 3 shows a flow chart of an example embodiment of a method according to the present disclosure.

FIG. 3 shows a flow chart of an example embodiment of a method according to the present disclosure. The flow chart in FIG. 3 provides for interpretation of reflection seismic surveys for both the circumstances where no measurements are made directly within subsurface formations, e.g., from within one or more wells drilled in the vicinity of the reflections seismic survey and identified at 30 as "no well areas." FIG. 3 also shows circumstances where measurements made directly in the subsurface formations are available, at 10 as "drilled areas."

Referring first to no well areas at 30, that is, where no direct measurements of subsurface formation properties are available, interval velocities are among standard parameters of a reflection seismic survey obtained from seismic data processing. The seismic interval velocities may be processed to obtain their inverse, interval transit time ("ITT") with respect to vertical depth at 32 and 12. At 34, a normal compaction trend (i.e., increase in seismic interval velocity or decrease of ITT with respect to vertical depth) may be established using the determined interval velocities. The normal compaction trend may be correlated with locations having wells or near such locations for compaction trend analysis. At 36, pore pressure curves may be calculated from the ITT of formations which depart from the normal compaction trend-using, for example, the equivalent depth method or Eaton method as set forth in the Background section herein. At 38, pore pressure and formation fracture gradients ("PPFG") with respect to vertical depth may be estimated. The pore pressure and fracture gradient values, which may be derived from interval velocities in formations having more shale faction content may be referred to collectively as "shale pressure." Pore pressure values derived from seismic velocities may be calibrated using pore pressure derived from well data, for example, well logs, drilling data and actual pressure measurements at 18. At 40, a lower shale fraction content indicator (therefore more sand fraction) formation interval may be estimated with respect to vertical depth as at the same time, as at shown at 38. This sand quality prediction can be calibrated with a formation evaluation derived from well data, for example, gamma ray measurements. At 42, a final curve obtained after calibrating for both pore pressure and sand presence may be referred to as a "clastics signature", which can be used for relative hydrocarbon net-to-gross estimation.

Referring to drilled areas at 10 in FIG. 3, where one or more wells have been drilled in the vicinity of the location where the reflection seismic survey had been made, wherein measurements were made directly in subsurface formations, for example, using well logging instruments. At 12, seismic interval velocities (or their inverse, interval transit time "ITT") may be calibrated/correlated with respect to vertical depth using measurements of one or more properties of the subsurface formations. For example, overburden gradient may be calibrated with respect to vertical depth using measurements of formation density from one or more wells. Such measurements may be made, for example using one or more types of well logging instruments moved along the interior of a well to make a record with respect to depth of one or more measured parameters of the subsurface formations. The depth of such measurements may be determined using a direct measure, for example, length of a an electrical cable or a coiled tubing extended into the well and having one or more well logging instruments disposed at one end of the coiled tubing or cable. Well logging measurements made using instruments disposed in a jointed pipe string may be recorded with respect to time and correlated to a record of pipe string position with respect to time to obtain a record of measurements with respect to depth. Similarly, seismic velocity may be calibrated with respect to depth using acoustic interval slowness measurements made using an acoustic well logging instrument. Any other measurements of a formation parameter with respect to depth made in or from the one or more wells may be analyzed at 14 to provide at 16, normal compaction trend with respect to depth and a formation parameter with respect to depth that is related to overburden gradient and formation fluid pressure gradient. For example and without limitation, such parameter(s) may include electrical resistivity, density, neutron porosity, drilling ("d-") exponent and acoustic interval slowness or acoustic velocity. At 18, the normal compaction trend determined at 16 may be used to estimate formation pore pressure with respect to depth. In some embodiments, the pore pressure estimated at 18 may be used to calibrate formation pore pressure determined from the reflection seismic survey interval velocities. At 20, measurements of formation fluid pressure made at selected depths within one or more wells, as well as geo-mechanics related measurements may be used to further calibrate estimates of pore pressure with respect to depth. At 22, formation with lower shale fraction with respect to depth may be determined from measurements made in one or more wells, e.g., natural gamma ray intensity or formation evaluation made using one or more of the above described types of well logging instruments. Such formation with lower shale fraction determination may be used to calibrate the formation shale fraction estimated using seismic interval velocities at 40.

Figure 4:
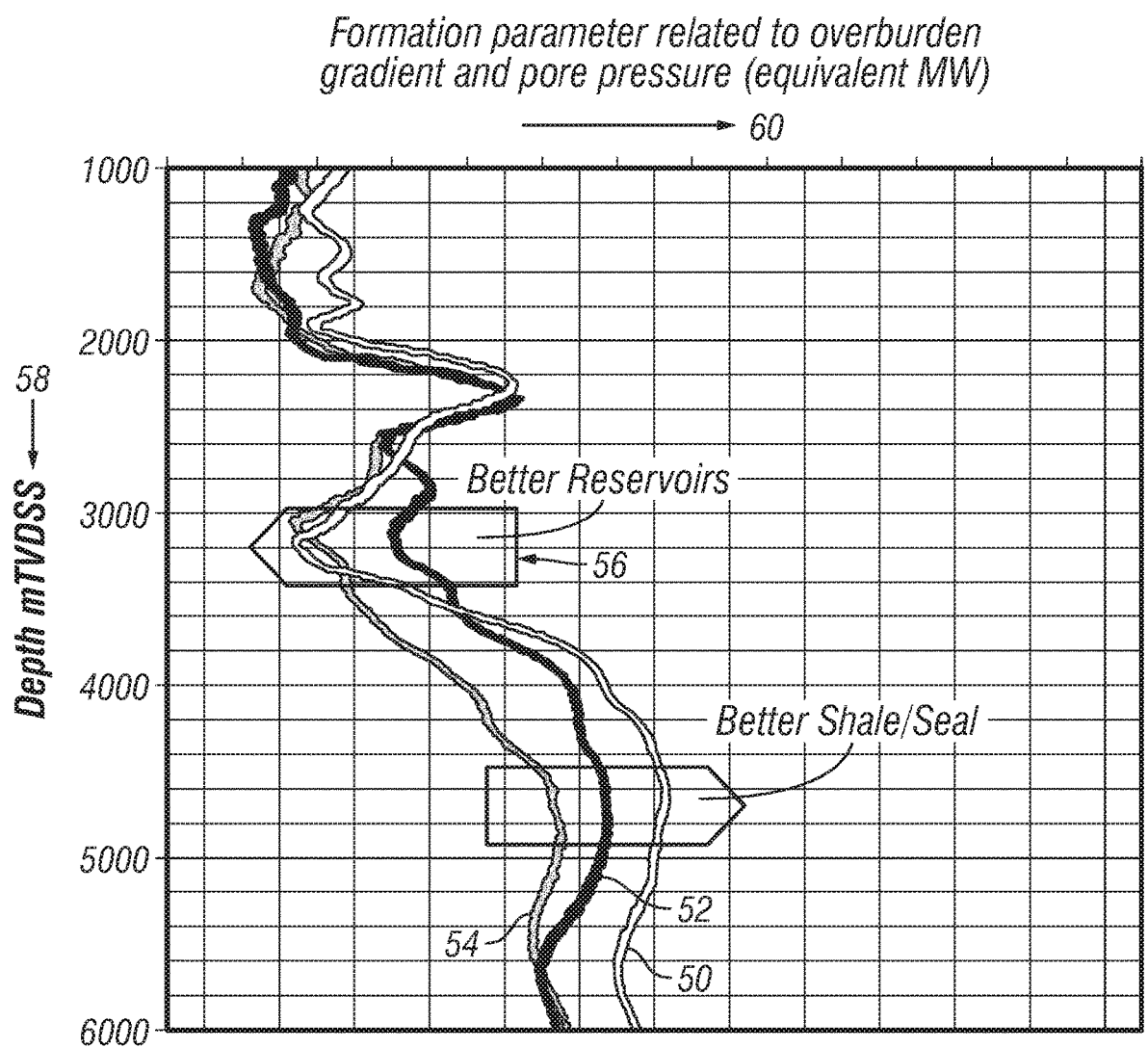
FIG. 4 shows graphs of a measured formation parameter with respect to depth.

FIG. 4 shows graphs of a formation parameter with respect to depth, i.e., the clastics signature, where the formation parameter is related in a determinable way to overburden stress and pore pressure. In a method according to the present disclosure, a relationship similar to that used to estimate formation fluid pressure may be used to estimate a fractional amount of shale, and correspondingly a fractional amount of sand, with respect to vertical depth. As shown in FIG. 4, formation parameter curves 50, 52 and 54 exhibit different pore pressure regimes (and therefore different shale quality or seal quality (a change in value at 60, corresponds to a better fluid pressure seal or higher pore pressure) with respect to depth (at 58). At 56, in the present example embodiment, the foregoing may be used to estimate the respective fractions of sand and shale with respect to vertical depth. Such estimation may be made without using measurements made directly in the subsurface formations or interval. The fraction of sand and fraction of shale may be used to estimate a seismic derived relative net-to-gross fraction of fluid volume in any identified formation or interval after calibrating with net-to-gross fraction values calculated for that same formation or interval at specific well location(s) using measurements in such well(s) made using well logging instruments, e.g., electrical resistivity, acoustic velocity or slowness, neutron porosity, density and gamma ray intensity. Seismic derived relative net-to-gross fraction may be understood as a ratio of fluid volume calculated for a shale-free formation or interval corrected for the fraction of shale with respect to sand content of the respective formation or interval.

Using a method according to the present disclosure it may be possible to estimate the quality of one or more subsurface formations as reservoirs (i.e., by estimating the shale fraction) using only reflection seismic surveys. In some embodiments, interval velocity values with respect to depth may be improved using measurements obtained directly from the subsurface formations, e.g., from measurements made in one or more wells proximate the reflection seismic survey using, for example well logging instruments such as those described above. Seismic derived relative net-to-gross fraction may be used to improve estimates of fluid deliverability (fluid production rate with respect to time) made at any prospective well location. Such deliverability estimates may be used, for example, to change constructions specifications for a prospective well. Such construction specifications may comprise casing diameters and setting depths and production tubing diameter needed for any such prospective well.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for estimating reservoir quality from a reflection seismic survey, comprising:
   determining seismic interval velocity with respect to depth from the reflection seismic survey;
   determining a normal compaction trend of the seismic interval velocity with respect to depth;
   estimating a fractional amount of sand and a fractional amount of shale at at least one depth based on deviation of the seismic interval velocity from the normal compaction trend at the at least one depth; and
   estimating seismic derived relative net-to-gross ratio of hydrocarbon volume in a reservoir.

2. The method of claim 1 wherein the estimating the fractional amount of sand and the fractional amount of shale is determined by the expression:

$$PP = OBG - (OBG - P_{Hyd}) * (ITT_{intobs}/ITT_{intnor})^x;$$

wherein PP represents formation fluid pressure gradient, wherein the fractional amount of sand is related to the formation fluid pressure gradient, OBG represents overburden gradient with respect to depth, $P_{Hyd}$ represents fluid hydrostatic pressure gradient, $ITT_{intnor}$ represents the normal compaction trend for seismic interval transit time (1/interval velocity), $ITT_{intobs}$ (1/Interval velocity) represents an observed seismic interval transit time with respect to depth and x represents an empirical exponent; and
   wherein the fractional amount of sand is related to the formation fluid pressure gradient.

3. The method of claim 1 wherein the estimating the fractional amount of sand and the fractional amount of shale is determined by the expression:

formation pore pressure=overburden vertical stress–effective stress $o$, wherein a relationship between the seismic interval velocity and effective stress is determinable.

4. The method of claim 1 further comprising calibrating the seismic interval velocity with respect to depth using measurements of a subsurface formation parameter made with respect to depth in a well.

5. The method of claim 4 wherein the subsurface parameter comprises at least one of natural gamma radiation intensity, Neutron porosity, density, electrical resistivity and acoustic travel time.

6. The method of claim 1 further comprising calibrating the estimated fractional amount of sand and fractional amount of shale at the at least one depth using measurements of a subsurface formation parameter made with respect to depth in a well.

7. The method of claim 6 wherein the measured subsurface formation parameter comprises natural gamma radiation intensity, neutron porosity, density, electrical resistivity and acoustic travel time.

8. The method of claim 1 further comprising using the seismic derived relative net-to-gross ratio to adjust at least one well construction parameter for a well to be drilled through the reservoir.

9. The method of claim 1 further comprising determining formation pore pressure with respect to depth from the normal compaction trend.

* * * * *